US008052516B2

(12) United States Patent
Saito

(10) Patent No.: US 8,052,516 B2

(45) Date of Patent: Nov. 8, 2011

(54) SLOT MACHINE

(75) Inventor: Hiroki Saito, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 806 days.

(21) Appl. No.: 12/113,551

(22) Filed: May 1, 2008

(65) Prior Publication Data

US 2009/0227321 A1 Sep. 10, 2009

Related U.S. Application Data

(60) Provisional application No. 61/033,547, filed on Mar. 4, 2008.

(51) Int. Cl.
*G06F 17/00* (2006.01)

(52) U.S. Cl. ........................................................ 463/20

(58) Field of Classification Search ............... 463/16–25
See application file for complete search history.

(56) References Cited

U.S. PATENT DOCUMENTS 6,394,902 B1 5/2002 Glavich et al.
2006/0281532 A1* 12/2006 Yoshizawa ...................... 463/20
2008/0058060 A1* 3/2008 Okada ............................ 463/20
2008/0305850 A1* 12/2008 Okada ............................ 463/20
2009/0227353 A1* 9/2009 Yoshizawa ...................... 463/20

* cited by examiner

*Primary Examiner* — Ronald Laneau
(74) *Attorney, Agent, or Firm* — NDQ&M Watchstone LLP

(57) ABSTRACT

A slot machine includes: a display device having a plurality of symbol display regions in which plural types of symbols are displayed; a memory for storing positional information of the symbol display regions in which predetermined symbols are arranged; and a processor for controlling the display and the memory, the processor being programmed to (a) execute a basic game; (b) execute a free game in a case where a predetermined condition is satisfied during the basic game; (c) rearrange the plural types of symbols during the free game; (d) store in the memory the positional information of the symbol display regions in which the predetermined symbols are arranged during the free game; and (e) rearrange the plural types of symbols during a last free game based on the stored positional information of the symbol display regions so that the predetermined symbols are arranged again in the symbol display regions in which the predetermined symbols have been arranged during past free games.

6 Claims, 16 Drawing Sheets

FIG.4A

| COMBINATION | PAYOUT |
|---|---|
| WILD-WILD-WILD | 200 |
| 7 - 7 - 7 | 100 |
| 3Bar-3Bar-3Bar | 30 |
| 2Bar-2Bar-2Bar | 20 |
| 1Bar-1Bar-1Bar | 10 |
| LOSE | 0 |

FIG.4B

| MAGNIFICATION / BET LINE | COMBINATION | | | | |
|---|---|---|---|---|---|
| | WILD | 7 | 3Bar | 2Bar | 1Bar |
| NINE | x1000 | x500 | x300 | x200 | x100 |
| ANY8 | x500 | x200 | x100 | x50 | x20 |
| ANY7 | x100 | x50 | x30 | x20 | x6 |
| ANY6 | x50 | x10 | x8 | x2 | x1 |
| ANY5 | x10 | x4 | x2 | | |
| ANY4 | x4 | x1 | | | |

SLOT MACHINE

CROSS-REFERENCE TO RELATED APPLICATIONS

This application claims priority of U.S. Provisional Application No. 61/033,547 filed on Mar. 4, 2008. The contents of this application are incorporated herein by reference in their entirety.

BACKGROUND OF THE INVENTION

1. Field of the Invention

The present invention relates to a slot machine.

2. Description of the Related Art

Conventionally, slot machines known as a type of gaming machines are constituted so as to: start games by players inserting coins or the like into the gaming machine; variably display columns of symbols in predetermined regions of the gaming machine while they are displayed in a stopped state after a predetermined period has elapsed; and award payout based on a combination of symbols in a stopped state.

In addition, the above slot machines are generally constituted to judge whether or not a winning combination allowed to award payout is established, based on whether or not a predetermined number of symbols of the same type (for example, "CHERRY" or "7") are arranged along a preset payline. In the conventional slot machine, in a case where a predetermined number or more of symbols of the same type are arranged, it has been a common routine to award payout based on the number of the aforementioned arranged symbols, regardless of the payout line.

Further, many of the conventional slot machines have been known which conduct two types of games, i.e., a basic game and a free game. The basic game is executed upon consumption of gaming values (such as coins or credits) corresponding to the bet amount. On the other hand, the free game is executed without consuming gaming values corresponding to the bet amount The basic game is switched to the free game when a predetermined condition is satisfied. The condition includes a case in which, for example, a specific symbol is displayed in a stopped state during the basic game. The free game is switched to the basic game when a predetermined condition is satisfied. The condition includes a case in which, for example, the free games are executed a predetermined number of times.

In the conventional slot machines, it has been a common routine to raise players' feeling of expectation for the free game by changing arrangement of symbols during the free game differently from that during the basic game. For example, U.S. Pat. No. 6,394,902-B1 describes a slot machine in which a total of fifteen symbols are displayed in three rows and five columns with the use of video reels. This slot machine changes symbol columns arranged on reels during the free game differently from that during the basic game, in which eight types of symbols are decreased to five. In this manner, a probability of awarding payout can be apparently increased during the free game.

In the aforementioned conventional slot machines, however, irrespective of whichever of the basic game and the free game is in progress, the symbols of different types have been randomly arranged in combination and sequential order. These slot machines determine the contents of the prize to be awarded, based on a combination of multiple symbols that have been arranged in a display device. Therefore, players are allowed to have the feeling of expectation only for random payout based on a combination of plural types of symbols that have been randomly arranged in the display device. Accordingly, a need exists for the advent of a slot machine which can offer new entertainability.

The present invention has been made in view of the above-described circumstance. It is an object of the present invention to provide a novel slot machine by enhancing entertainability associated with arrangement of the symbols during the free game.

SUMMARY OF THE INVENTION

A first aspect of the present invention is a slot machine including: a display device having a plurality of symbol display regions in which plural types of symbols are displayed; a memory for storing positional information of the symbol display regions in which predetermined symbols are arranged; and a processor for controlling the display and the memory, the processor being programmed to: (a) execute a basic game; (b) execute a free game in a case where a predetermined condition is satisfied during the basic game; (c) rearrange the plural types of symbols during the free game; (d) store in the memory the positional information of the symbol display regions in which the predetermined symbols are arranged during the free game; and (e) rearrange the plural types of symbols during a last free game based on the stored positional information of the symbol display regions so that the predetermined symbols are arranged again in the symbol display regions in which the predetermined symbols have been arranged during past free games.

According to the first aspect of the present invention, when a predetermined type of symbols are arranged during the free game, all of the symbols are rearranged during the last free game at positions where they have been arranged during the past free games. Therefore, for example, when symbols "WILD" are displayed on a display device during the free games, all of these symbols "WILD" reappear during the last free game at which they have been displayed. Therefore, the slot machine is allowed to raise players' expectation for payout, thereby enhancing entertainability related to arrangement of the symbols during the free game.

A second aspect of the present invention is a slot machine constituted as set fourth below. In the first aspect, the processor is further programmed to: (f) display the predetermined symbols so as to make identifiable rearrangement of the predetermined symbols during the last free game in the symbol display regions in which the predetermined symbols have been arranged during free games from a free game subsequent to a first free game to the last free game.

According to the second aspect of the present invention, when a predetermined symbol is arranged during the free game, for example, a frame is displayed so as to surround the display region of the predetermined symbol, and a color of the frame is repeatedly changed during the last free game. In this manner, various effects can be provided, thereby enhancing entertainability related to arrangement of the symbols during the free game.

A third aspect of the present invention is a slot machine constituted as set forth below. In the second aspect, the processor is further programmed to: (g) determine a number of times of the free game; and (h) terminate the free game before executing the free game the determined number of times in a case where the predetermined symbols are arranged at all positions of the symbol display regions.

According to the third aspect of the present invention, even where the free game is not executed the determined number of times, the game is terminated when a predetermined type of symbols are arranged in all of the display regions. For example, when symbols "WILD" are arranged in all of the display regions, the free game is terminated. In this manner, the slot machine is allowed to raise players' expectation for the free game thereby enhancing entertainability related to arrangement of the symbols during the free game.

A fourth aspect of the present invention is a slot machine including: a display device having a plurality of symbol display regions in which plural types of symbols are displayed; a memory for storing positional information of the symbol display regions in which a predetermined symbols are arranged; and a processor for controlling the display and the memory, the processor being programmed to: (a) execute a basic game; (b) execute a free game in a case where a predetermined condition is satisfied during the basic game; (c) rearrange the plural types of symbols during the free game; (d) store in the memory the positional information of the symbol display regions in which the predetermined symbols are arranged during the free game; and (e) display the predetermined symbols so as to make identifiable rearrangement of the predetermined symbols during a last free game in the symbol display regions in which the predetermined symbols have been arranged during free games from a free game subsequent to a first free game to the last free game; and (f) rearrange the plural types of symbols during the last free game based on the stored positional information of the symbol display regions so that the predetermined symbols are arranged again in the symbol display regions in which the predetermined symbols have been arranged during past free games.

According to the fourth aspect of the present invention, when a predetermined number of symbols "WILD", for example, are arranged during the free game, for example, a frame is displayed so as to surround a display region of each of the symbols "WILD", and a color of the frame is repeatedly changed till the last free game. All of these symbols "WILD" then reappear in the displayed frames during the last free game. Therefore, the slot machine is allowed to raise players' expectation for payout, thereby enhancing entertainability related to arrangement of the symbols during the free game.

A fifth aspect of the present invention is a slot machine constituted as set forth below. In the fourth aspect, the processor is further programmed to: (g) determine a number of times in executing the free game; and (h) terminate the free game before executing the free game the determined number of times in a case where the predetermined symbols are arranged at all positions of the symbol display regions.

According to the fifth aspect of the present invention, even where the free game is not executed the determined number of times, the game is terminated without being executed the left number of times, when a predetermined type of symbols are arranged in all of the display regions. For example, when a type of symbols "WILD" are arranged in all of the display regions, the free game is terminated. In this manner, the slot machine is allowed to raise players' expectation for the free game, thereby enhancing entertainability related to arrangement of the symbols during the free game.

A sixth aspect of the present invention is a slot machine including: a display device having a plurality of symbol display regions in which plural types of symbols are displayed; a memory for storing positional information of the symbol display regions in which predetermined symbols are arranged; and a processor for controlling the display and the memory, the processor being programmed to: (a) execute a basic game; (b) execute a free game in a case where a predetermined condition is satisfied during the basic game; (c) determine a number of times in executing the free game; (d) rearrange the plural types of symbols during the free game; (e) store in the memory the positional information of the symbol display regions in which the predetermined symbols are arranged during the free game; (f) display the predetermined symbols so as to make identifiable rearrangement of the predetermined symbols during a last free game in the symbol display regions in which the predetermined symbols have been arranged during free games from a free game subsequent to a first free game to the last free game; (g) rearrange the plural types of symbols during the last free game based on the stored positional information of the symbol display regions so that the predetermined symbols are arranged again in the symbol display regions in which the predetermined symbols have been arranged during past free games; and (h) terminate the free game before executing the free game the determined number of times in a case where the predetermined symbols are arranged at all positions of the symbol display regions.

According to the sixth aspect of the present invention, when a predetermined type of symbols "WILD", for example, are arranged during the free game, a frame is displayed so as to surround a display region of the symbol "WILD", and a color of the frame is repeatedly changed till the last free game. All of these symbols "WILD" then reappear in the displayed frames during the last free game, thus allowing provision of various effects. Furthermore, even where the free game is not executed the determined number of times, the game is terminated without being executed the remaining number of times, when a predetermined type of symbols are arranged in all of the display regions. For example, when symbols "WILD" are arranged in all of the display regions, the free game is terminated. In this manner, the slot machine is allowed to raise players' expectation for the free game, thereby enhancing entertainability related to arrangement of the symbols during the free game.

BRIEF DESCRIPTION OF THE DRAWINGS

FIG. 4A is a table providing a correspondence relationship between various symbols and payouts according to the first embodiment;

FIG. 4B is a table providing a correspondence relationship between various symbols and payouts according to the first embodiment;

DESCRIPTION OF THE PREFERRED EMBODIMENTS

Figure 1A:
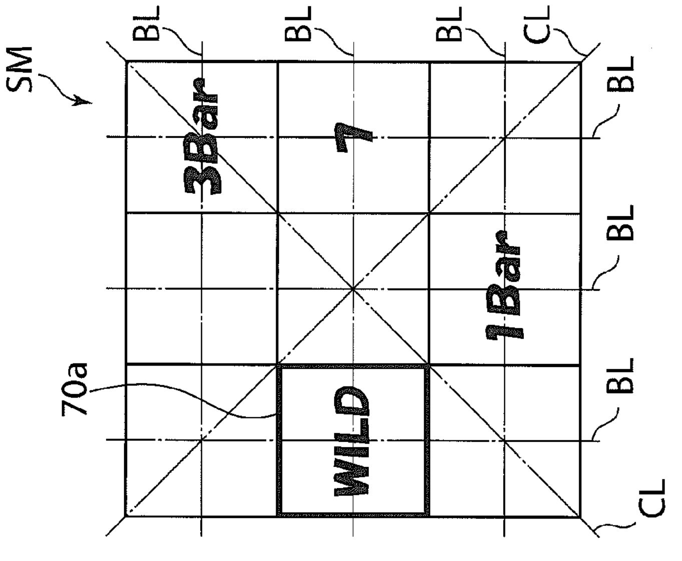
FIG. 1A is a view showing an exemplary symbol matrix during a free game according to a first embodiment.

First, a slot machine 10 according to a first embodiment will be described with referring to the drawings. The slot machine according to the first embodiment is a so-called video slot machine, which has an image display panel such as a liquid crystal display and executes a game by displaying images of various symbols on the image display panel.

Figure 1B:
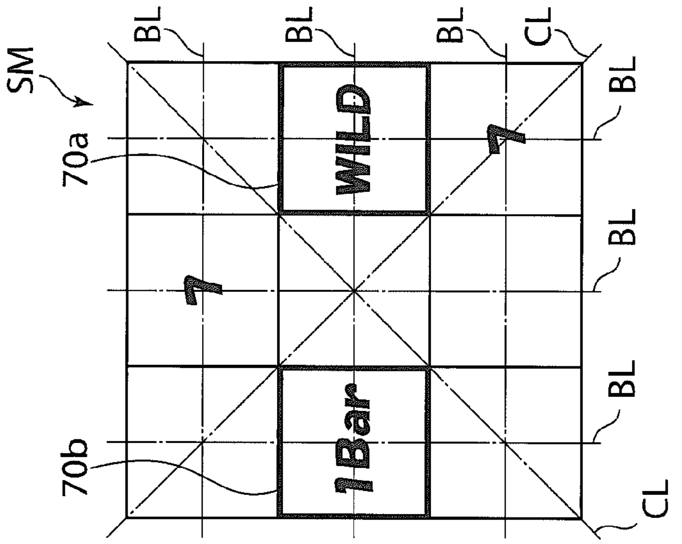
FIG. 1B is a view showing an exemplary symbol matrix during a free game according to the first embodiment.
Figure 1C:
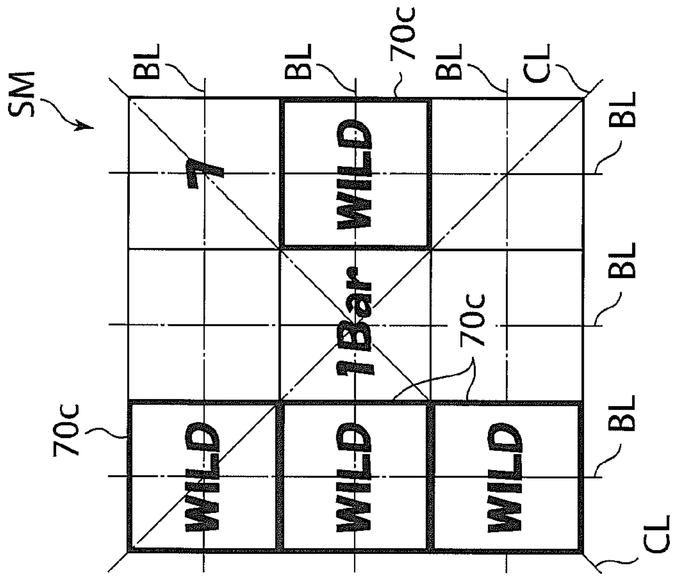
FIG. 1C is a view showing an exemplary symbol matrix during a free game according to the first embodiment.

FIGS. 1A and 1B are views each showing an exemplary symbol matrix during a free game according to the first embodiment. FIG. 1C is a view showing an exemplary symbol matrix at the time of termination of the free game according to the first embodiment. The slot machine 10 according to the present invention executes either one of two modes of games, i.e., a basic game and a free game. The basic game is executed upon consuming a gaming value corresponding to the amount bet by a player. The free game is executed without consuming a gaming value. The slot machine 10 is of a stand-alone type, which is not connected to a network, but the present invention is applicable to a networked slot machine.

As shown in FIGS. 1A to 1C, symbol matrix elements SM are displayed in a lower image display panel 16 described later, included in the slot machine 10. The symbol matrix elements SM are made up of a total of nine symbols in three columns and three rows. In the symbol matrix elements SM, six basic lines BL are set along the columns or the rows, respectively. In the embodiments of the present invention, the basic line is defined as a winning line other than a cross line. Furthermore, two cross lines CL obliquely across the symbol matrix elements SM are set. The eight wining lines in the embodiments of the present invention contain the basic lines BL and the cross lines CL.

In the embodiments of the present invention, any of the symbols, "Blank", "1Bar", "2Bar", "3Bar", "7", and "WILD" are rearranged in the symbol matrix elements SM. Payout is determined based on a combination of these symbols on the wining lines and the number of symbols rearranged in the symbol matrix elements SM.

As shown in FIG. 1A, in a case where the symbol "WILD" is rearranged in any of the symbol matrix elements SM, a frame 70*a* is identifiably displayed in the symbol matrix element SM where the symbol "WILD" is rearranged. The symbols "Blank", "1Bar", "2Bar", "3Bar", "7", and "WILD" are rearranged, and the frame 70*a* is identifiably displayed in the symbol matrix element SM in which the symbol "WILD" is rearranged in order to make identifiable the rearrangement of the symbol "WILD".

As shown in FIG. 1B, a frame 70*a* is identifiably displayed in a case where the symbol "WILD" is rearranged in any one of the symbol matrix elements AM during the free game. Where the symbol "WILD" has been rearranged during the past games, a frame 70*b* is identifiably displayed. In this case, the symbols "Blank", "1Bar", "7", and "WILD" are rearranged. Therefore, the frame 70*a* is displayed in the symbol matrix element SM in which the symbol "WILD" is displayed, to make identifiable the rearrangement thereof. The frame 70*b* of a color different from that of the frame 70*a* is displayed in the symbol matrix element SM, in which the symbol "1Bar" is rearranged, so as to identify that the symbol "WILD" is rearranged during the past games.

As shown in FIG. 1C, where the symbol "WILD" is rearranged in any one of the symbol matrix elements SM at the time of the last free game on condition that the symbol "WILD" has been rearranged during the past free games, a frame 70*c* in a color different from those of frames 70*a*, 70*b* is identifiably displayed, and the symbol "WILD" is rearranged in the symbol matrix element SM in which the frame 70*c* has been displayed. In this manner, during the last free game, the symbol "WILD" is rearranged at the same position at which the symbol "WILD" has been arranged during the past free games. The symbols "Blank", "1Bar", "7", and "WILD" are rearranged, and the payout corresponding to a winning combination of the symbols "WILD" is determined.

Figure 2:
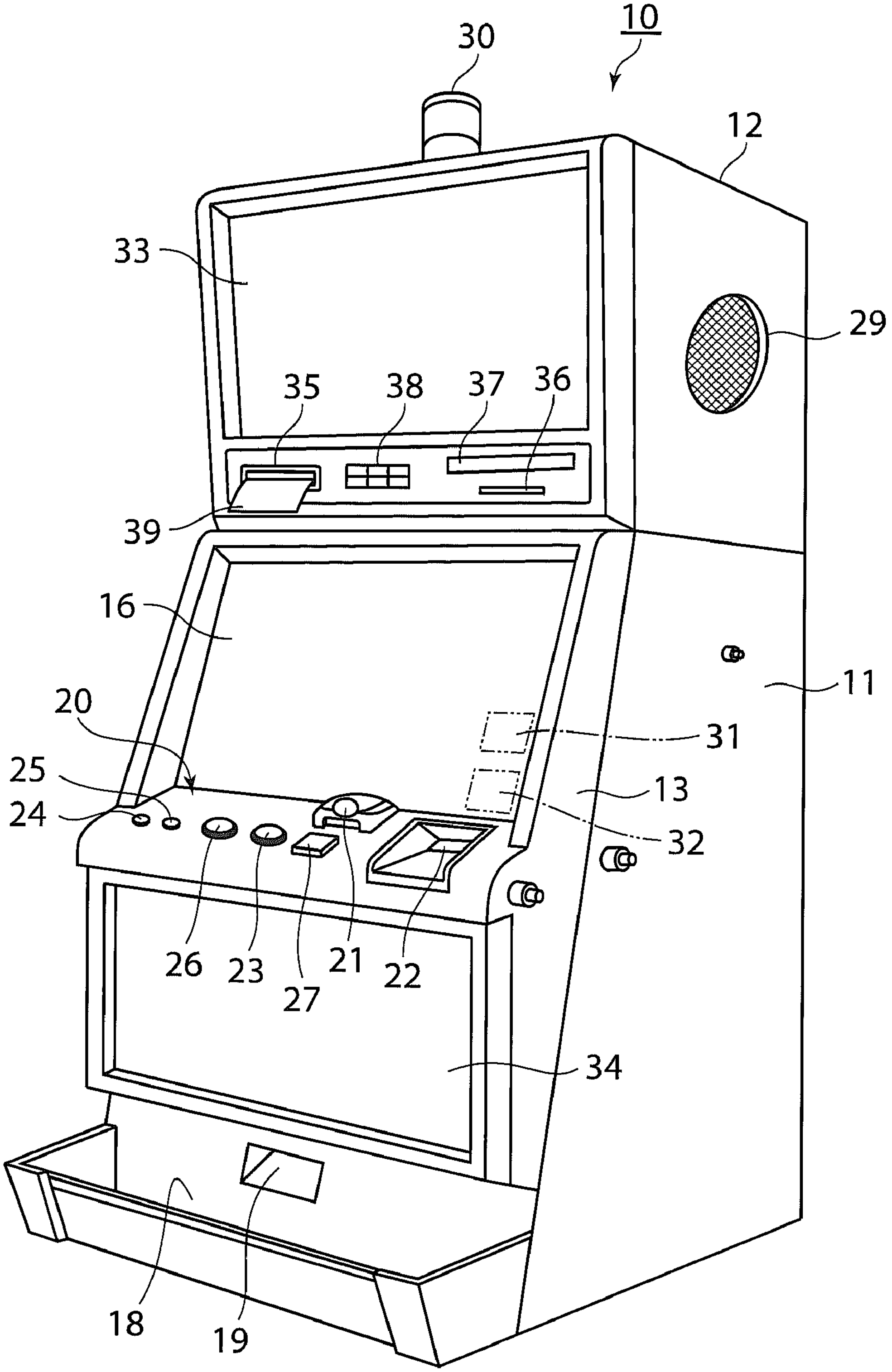
FIG. 2 is a perspective view showing a frame format of a slot machine according to the first embodiment.

FIG. 2 is a view schematically depicting a frame format of an appearance of the slot machine according to the first embodiment. The gaming media used in the slot machine 10 include coins, bills, or electronic value information equivalent thereto. In the present invention, however, the gaming media are not limitative thereto in particular, and can include medals, tokens, electric money, and tickets, for example. The above tickets are not limitative in particular, and can include barcode-attached tickets or the like, as described later, for example.

The slot machine 10 is provided with a cabinet 11, a top box 12 installed on an upper side of the cabinet 11, and a main door 13 provided on a front surface of the cabinet 11.

The lower image display panel 16 serving as a display is provided in front of the main door 13. The lower image display panel 16 is provided with a liquid crystal panel, which displays the nine symbol matrix elements SM in three columns and three rows. In each symbol matrix element SM, one symbol is arranged.

In the symbol matrix elements SM of the lower image display panel 16, winning lines containing six basic lines BL and two cross lines CL, are set. The six basic lines BL are along the columns or rows, respectively while the cross lines are obliquely across the symbol matrix elements SM. The basic lines BL and the cross lines CL as winning lines define a combination of symbols.

A payout amount display section 31 of the lower image display panel 16 displays the number of coins credited by way of an image. A payout amount display unit 32 displays by way of an image the number of coins to be paid if a predetermined combination of symbols are rearranged on the winning line.

Provided on a lower side of the lower image display panel 16 are a control panel 20 having a plurality of buttons 23 to 27 through which command regarding the process of the game will be input by a player, a coin receiving slot 21 for receiving coins into the cabinet 11, and a bill validator 22.

On the control panel 20, a start button 23, a change button 24, a cashout button 25, a 1-BET button 26, and a max-BET button 27 are provided. The start button 23 is intended for entering a command for starting the game. The change button 24 is intended for use in asking an attendant of the gaming facility for change. The cashout button 25 is intended for entering a command for paying the credited coins to a coin tray 18 through a coin payout exit 19.

The 1-BET button 26 is intended for entering a command for betting one coin among the credited coins on the game. The max-BET button 27 is intended for entering a command for betting the upper number (50 in this embodiment) of coins that can be bet per game among the credited coins on the game.

The bill validator 22 validates whether or not a bill is legitimate and accepts a legitimate bill into the cabinet 11. The bill validator 22 may be configured so that a barcode-attached ticket 39 described later is readable thereby. Provided on a lower front surface of the main door 13, that is, at a lower part of the control panel 20, is a berry glass 34 on which characters of the slot machine 10 and the like are depicted.

On a front surface of the top box 12, an upper image display panel 33 is provided. The upper image display panel 33 has a liquid crystal panel, which displays images for introducing the game contents or explaining game rules, for example.

Also, on the top box 12, a lamp 30 and a speaker 29 are provided. On a lower side of the upper image display panel 33, a ticket printer 35, a card reader 36, a data display 37, and a key pad 38 are provided. The ticket printer 35 prints on the ticket, a barcode having encoded thereon data such as the credit amount, the date and time, and the identification number of the slot machine 10, and outputs the printed ticket as the barcode-attached ticket 39. The player can play the game on another slot machine with the barcode attached ticket 39 by causing this slot machine to read the barcode attached ticket 39. Alternatively, the player can exchange the barcode-attached ticket 39 with the bills or the like at a predetermined place (at a cashier inside a casino, for example) of the gaming facility.

The card reader 36 reads data from and write data into a smart card. The smart card is to be owned by the player, which stores data for identifying the player or data regarding the log of games executed by the player, for example. The smart chard may store data corresponding to coins, bills, or a credit. As an alternative of a smart card, a magnetic stripe card may be employed. The data display 37 is made up of a fluorescent display and the like, and displays the data read by the card reader or the data input by the player through the key pad 38, for example. The key pad 38 inputs data and commands regarding the ticket issuance or the like.

Figure 3:
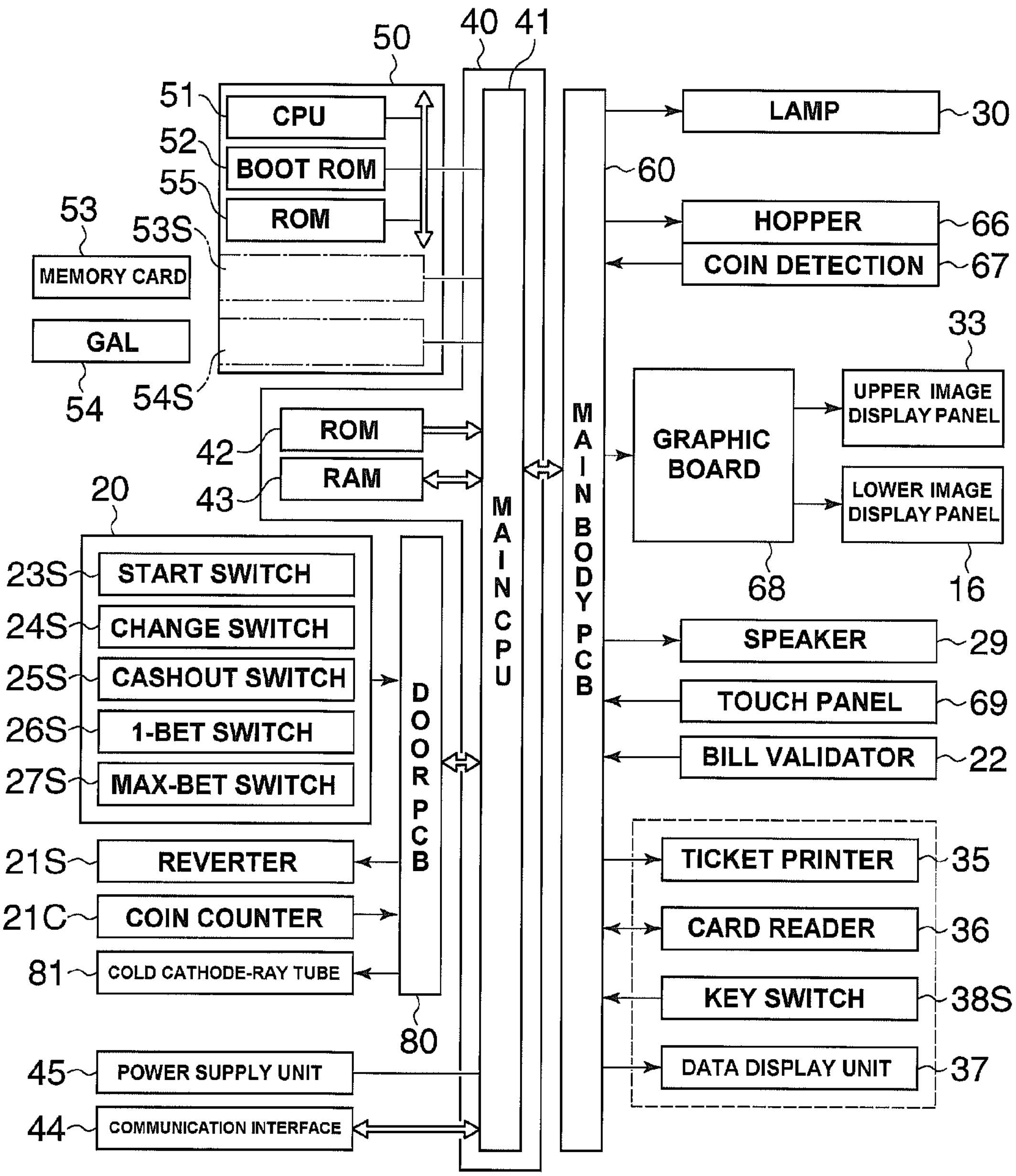
FIG. 3 is a block diagram depicting an internal construction of the slot machine shown in FIG. 2.

FIG. 3 is a block diagram depicting the internal construction of the slot machine shown in FIG. 2. A gaming board 50 includes: a CPU (Central Processing Unit) 51, a ROM (Read Only Memory) 55 and a boot ROM 52 interconnected by an internal bus; a card slot 53S corresponding to a memory card 53; and an IC socket 54S corresponding to a GAL (Generic Array Logic) 54.

The memory card 53 is formed of a nonvolatile memory such as Compact Flash (registered trademark) and stores game programs. The game programs include a symbol selection program. The aforementioned symbol selection program is intended for determining the symbols to be rearranged in the symbol matrix elements SM. The aforementioned symbol selection program includes symbol weighing data respectively corresponding to plural types of payout ratios (80%, 84%, 88%, for example). The symbol weighting data is indicative of the correspondence relationship between the respective symbols and one or more random numeric values which come under a predetermined numerical range (0 to 255). The payout ratio is determined according to the payout-ratio setting data output from the GAL 54. The symbols to be rearranged in the symbol matrix elements SM are determined depending upon the symbol weighing data corresponding to this payout ratio. Further, the game programs include table data (see FIGS. 4A and 4B) indicating the correspondence relationship between each of the symbols and a payout.

Also, the card slot 53S is configured to allow the memory card 53 to be inserted thereinto or ejected therefrom, and is connected to a mother board 40 through IDE pass. Accordingly, the memory card 53 can be ejected from the card slot 53S, other game programs and other game system programs can then be written into the memory card 53, and further, the memory card 53 can be inserted into the card slot 53S, thereby allowing the player to change the types and contents of games executed in the slot machine 10. The game program includes data concerning a game progress. Furthermore, the game program includes image data or sound data to be output during the game. The image data include, for example, image data indicative of the symbol matrix.

The GAL 54 is a type of a PLD having a fixed OR array structure. The GAL 54 includes plural input ports and plural output ports. Where predetermined data is input to the input port, the GAL 54 outputs data corresponding to the aforementioned data from the output port. The data output from this output port is equivalent to the aforementioned payout-ratio setting data. Further, the IC socket 54S is configured to allow the GAL 54 to be attached thereto and detached therefrom, and is connected to the mother board 40 by a PCI bus. Accordingly, the GAL can be replaced with the replacement GAL 54 to change the payout-ratio setting data.

The CPU 51, the ROM 55, and the boot ROM 52 interconnected by the internal bus are connected to the mother board 40 by the PCI bus. The PCI bus serves to transmit signals between the mother board 40 and the gaming board 50 and supply power from the mother board 40 to the gaming board 50.

The mother board 40 is constructed using a general-purpose mother board commercially available (a printed circuit board on which essential parts of a personal computer are mounted) and includes: a main CPU (Central Processing Unit) 41, a ROM (Read Only Memory) 42; a RAM (Random Access Memory) 43; and a communication interface 44. The main CPU 41 functions as a processor for controlling a display device and memory according to the embodiment of the present invention.

The ROM 42 is made up of a memory device such as a flash memory and stores thereon a program such as BIOS (Basic Input/Output System) executed by the main CPU 41, and permanent data. When the BIOS is executed by the main CPU 41, processing of initializing predetermined peripheral devices is carried out and processing of capturing game programs and game system programs stored in the memory card 53 through the gaming board 50 is started. In the present invention, the contents of the ROM 42 may be rewritable or not.

The RAM 43 stores data and a program used when the main CPU 41 is activated. The RAM 43 can also store game programs. The RAM 43 further stores data concerning the credit amount, the number of coin-in or coin-out for one game, and the like.

Both a main body PCB (Printed Circuit Board) 60 and a door PCB 80, which will be described later, are connected to the mother board 40 by USB. A power supply unit 45 is also connected to the mother board 40.

Connected to the main body PCB 60 and the door PCB 80 are: equipment and devices which generate input signals to be input to the main CPU 41; and equipment and devices of which operations are controlled by a control signal output from the main CPU 41. The main CPU 41 executes a game program stored in the RAM 43 based on an input signal having been input to the main CPU 41 and performs a predetermined computational process, thereby storing results thereof in the RAM 43 or transmitting a control signal to each of equipment and devices as a control process therefor.

A lamp 30, a hopper 66, a coin detecting section 67, a graphic board 68, a speaker 29, a touch panel 69, the bill validator 22, the ticket printer 35, the card reader 36, a key switch 38S, and the data display unit 37 are connected to the main body PCB 60. The lamp 30 is lit up in a predetermined pattern based on a control signal output from the main CPU 41.

The hopper 66 is installed in the cabinet 11 and pays out a predetermined number of coins from the coin payout exit 19 to the coin tray 18 based on a control signal output from the main CPU 41. The coin detecting section 67 is installed inside the coin payout exit 19 and outputs an input signal to the main CPU 41 upon detecting that a predetermined number of coins have been paid out from the coin payout exit 19.

The graphic board 68 controls, based on a control signal output from the main CPU 41, images to be displayed on the upper image display panel 33 and the lower image display panel 16. The credit amount stored in the RAM 43 is displayed on a credit amount display section 31 (see FIG. 2) of the lower image display panel 16. The number of coins to be paid out is displayed at a payout amount display section 31 (see FIG. 2) of the lower image display panel 16. The graphic board 68 is equipped with a VDP (Video Display Processor) which generates image data based on a control signal output from the main CPU 41 and a video RAM which temporarily stores image data generated by the VDP, and the like. The image data used in generating image data with VDP is contained in the game program read from the memory card 53 and stored in the RAM 43.

The bill validator 22 validates whether or not a bill is legitimate and accepts a legitimate bill into the cabinet 11. Upon accepting a legitimate bill, the bill validator 22 outputs an input signal to the main CPU 41 based on the amount of the bill. The main CPU 41 stores in the RAM 43 the credit amount corresponding to the amount of bills transmitted by the input signal.

Based on a control signal output from the main CPU 41, the ticket printer 35 prints on a ticket a barcode having encoded thereon data such as the credit amount, data and time, and the identification number of the slot machine 10 stored in the RAM 43. Further, this printer outputs the printed ticket as a barcode-attached ticket 39. The card reader 36 transmits to the main CPU 41 the data read from the smart card and writes the read data onto the smart card, based on a control signal from the main CPU 41. The key switch 38S is provided on the key pad 38, and outputs a predetermined input signal to the main CPU 41 when the player operates the key pad 38. The data display 37, based on a control signal output from the main CPU 41, displays the data read by the card reader 36 and the data input by the player through the key pad 38.

A control panel 20, a reverter 21S, a coin counter 21C, and a cold cathode tube 81 are connected to a door PCB 80. The control panel 20 is provided with: a start switch 23S corresponding to the start button 23; a change switch 24S corresponding to the change button 24; a cashout switch 25S corresponding to a cashout button 25; a 1-BET switch 26S corresponding to a 1-BET button 26; and a max-BET switch 27S corresponding to the max-BET button 27. When the player operates the buttons 23 to 27, the corresponding switches 23S to 27S output input-signals to the main CPU 41, respectively.

The coin counter 21C is provided inside the coin receiving slot 21, and validates whether or not a legitimate coin is inserted into the coin receiving slot 21. Those other than the legitimate coins are discharged from the coin payout exit 19. The coin counter 21C outputs an input signal to the main CPU 41 when a legitimate coin is detected.

The reverter 21S operates based on a control signal output from the main CPU 41 and distributes coins recognized as being legitimate by the coin counter 21C into a cash box (not shown in the drawings) or the hopper 66 which is arranged in the slot machine 10. In other words, when the hopper 66 is filled with coins, legitimate coins are distributed by the reverter 21S into the cash box. On the other hand, when the hopper 66 is not filled with coins, legitimate coins are distributed into the hopper 66. The cold cathode tube 81 functions as a backlight installed on rear face side of each of the lower image display panel 16 and the upper image display panel 33, and is lit up based on a control signal output from the main CPU 41.

FIGS. 4A and 4B are views each showing a correspondence relationship between respective symbols and payouts. As shown in FIG. 4A, where a predetermined symbol is rearranged on a winning line on which the player has bet, LIN payout is determined based on a winning combination. Furthermore, where the predetermined number of identical symbols are rearranged in the symbol matrix elements SM, as shown in FIG. 4B, ANY payment is determined based on a winning combination. The LIN payout is obtained in a case where a winning combination appear as one of the combinations of symbols "7-7-7", "3Bar-3Bar-3Bar", "2Bar-2Bar-2Bar", and "1Bar-1Bar-1Bar" on the winning lines set in the nine symbol matrix elements SM, which are made up of the basic lines BL and the cross lines CL. The ANY payout is obtained according to the number of symbols, "WILD", "7", "3Bar", "2Bar", "1Bar", which are rearranged in the symbol matrix elements SM.

Figure 5A:
FIG. 5A is a view showing an exemplary image displayed during the free game in the slot machine shown in FIG. 2.

FIGS. 5A to 8B are views each showing an exemplary image displayed on the slot machine shown in FIG. 2 according to the first embodiment. FIGS. 5A and 5B each show an exemplary image displayed in the slot machine shown in FIG. 2 during the free game. As shown in FIG. 5A, upon start of the free game, the upper image display panel 33 displays a free-game-number display image 90*a* indicative of the number of times in executing the free game. In this case, the free-game-number display image 90*a* of "10 FREE GAME" is displayed indicating that the number of times in executing the free game has been set to 10.

Figure 5B:
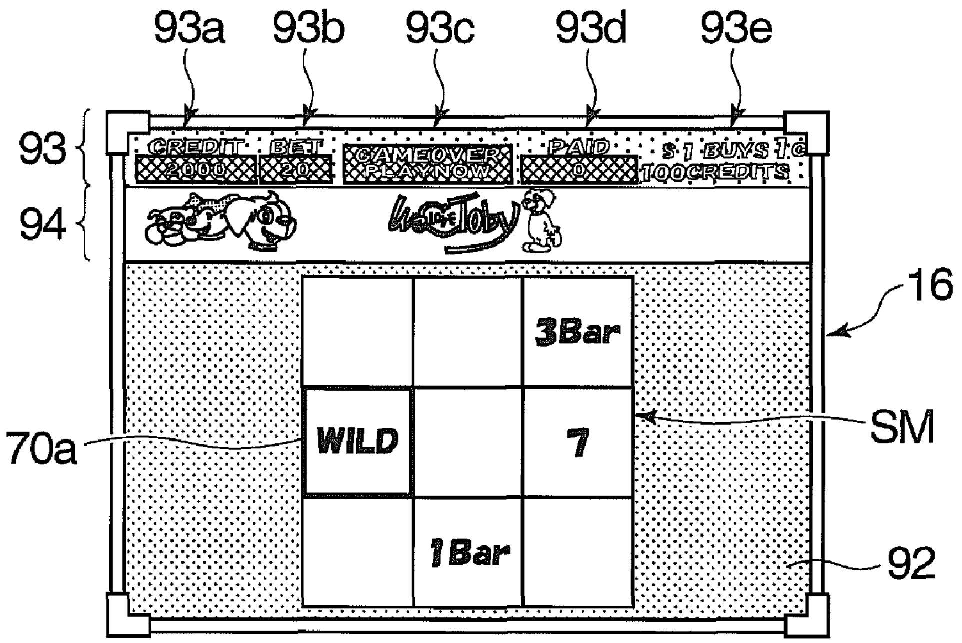
FIG. 5B is a view showing an exemplary image displayed during the free game in the slot machine shown in FIG. 2.

As shown in FIG. 5B, the lower image display panel 16 is made up of a display region 92, an information display section 93, an effect image display section 94, and the like. In the display region 92, the symbol matrix elements SM are displayed. The information display section 93 is arranged at an upper side of the display region 92 and is made up of a credit amount display section 93*a*, a BET amount display section 93*b*, a character information display section 93*c*, a PAID amount display section 93*d*, and a charge display section 93*e*.

The number of coins presently credited is displayed at the credit amount display section 93*a* while the number of coins bet in one game is displayed at the BET amount display section 93*b*. The character information indicative of a current status of the game is displayed at the character information display section 93. The characters of "PLAYNOW" are displayed during the play of the game, whereas the characters of "GAMEOVER" are displayed at the intervals between the plays of the game. The number of coins that have been successfully obtained in one game is displayed at the PAID amount display section 93*d*, whereas a conversion value of the credit amount based on a predetermined charge is displayed at the charge display section.

At the effect image display section 94, effect images in accordance with a type of the present slot game are displayed. Therefore, the effect image display section 94 displays effect images which are different depending on the basic and free games.

A total of nine symbols in three columns and three rows are rearranged in the symbol matrix elements SM displayed on the lower image display panel 16. Any of the symbols "Blank", "1Bar", "2Bar", "3Bar", "7", and "WILD" are rearranged in the symbol matrix elements SM. Where the symbol "WILD" is arranged in any one of the symbol matrix elements SM, a frame 70*a* is identifiably displayed in the symbol matrix element SM in which the symbol "WILD" is rearranged.

The symbols "Blank", "1Bar", "3Bar", "7", and "WILD" are rearranged, and the frame 70*a* is identifiably displayed in the symbol matrix element SM in which the symbol "WILD" is rearranged in order to make identifiable the rearrangement of the symbol "WILD".

Figure 6A:
FIG. 6A is a view showing an exemplary image displayed during the free game in the slot machine shown in FIG. 2.
Figure 6B:
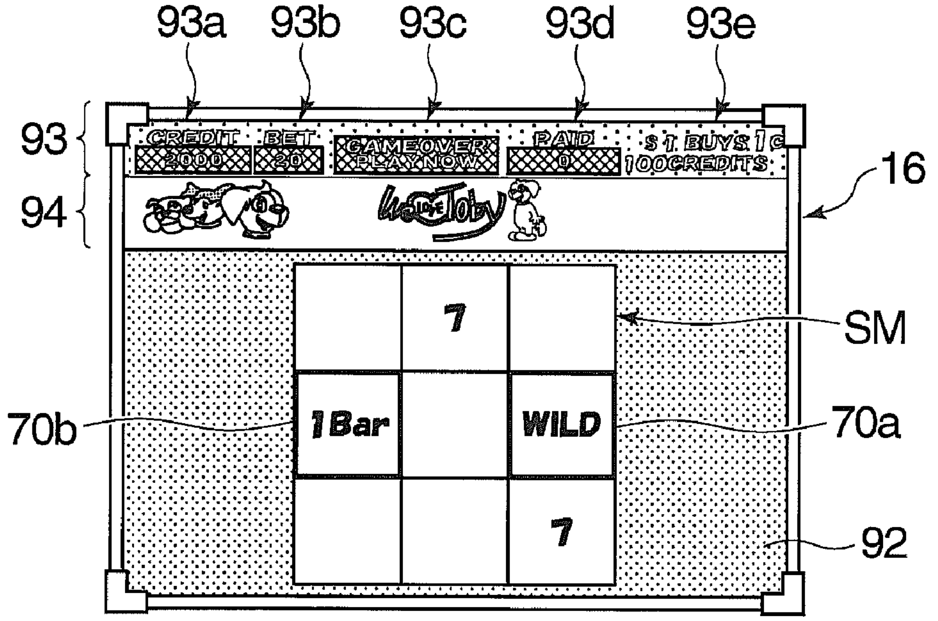
FIG. 6B is a view showing an exemplary image displayed during the free game in the slot machine shown in FIG. 2.

FIGS. 6A and 6B are views each showing an exemplary image displayed during the free game on the slot machine shown in FIG. 2. As shown in FIG. 6A, in a case where the free game is executed more than once, the upper image display panel 33 displays a free-game-number display image 90*b* indicative of the remaining number of times in executing the free game. In this case, the free-game-number display image 90*b* of "5FREE GAME" is displayed indicating that five free games remain.

As shown in FIG. 6B, the display region 92 displays the symbol matrix elements SM, in which a frame 70*a* is identifiably displayed if the symbol "WILD" is rearranged in any of the symbol matrix elements during the free game. Where the symbol "WILD" has been rearranged during the past games, a frame 70*b* is displayed to make identifiable the rearrangement of the symbol "WILD" in the past free games. In this case, the symbols "Blank", "1Bar", "7", and "WILD" are rearranged. Therefore, the frame 70*a* is displayed in the symbol matrix element SM displaying the "WILD" so as to make identifiable the rearrangement of the symbol "WILD". The frame 70*b* in a color different from that of the frame 70*a* is displayed in the symbol matrix element SM. The symbol "1Bar" is rearranged so as to make identifiable the rearrangement of the symbol "WILD" during the past games.

Figure 7A:
FIG. 7A is a view showing an exemplary image displayed during the free game in the slot machine shown in FIG. 2.
Figure 7B:
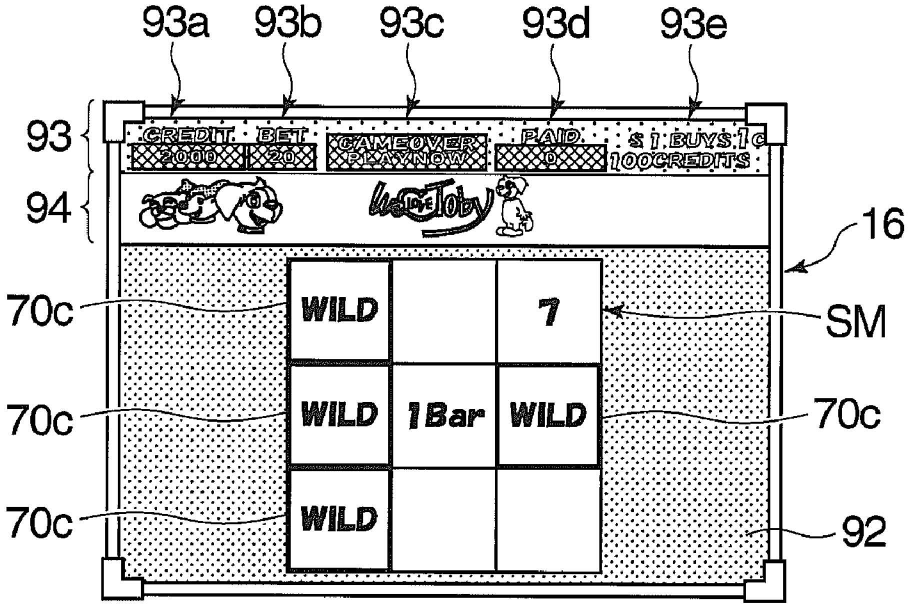
FIG. 7B is a view showing an exemplary image displayed during the free game in the slot machine shown in FIG. 2.

FIGS. 7A and 7B are views each showing an exemplary image displayed at the time of the last free game on the slot machine shown in FIG. 2. As shown in FIG. 7A, upon execution of the last free game, the upper mage display panel 33 displays a last-free-game display image 90*c* indicative of the last free game. In this case, the last-free-game display image 90*c* of "0FREE GAME" is displayed which is indicative of the last free game.

As shown in FIG. 7B, the display region 92 displays the symbol matrix elements SM at the time of the last free game. Where the symbol "WILD" is rearranged in any one of the symbol matrix elements SM at the time of the free game on condition that the symbol "WILD" has been rearranged during the past free games, a frame 70*c* is identifiably displayed, and the symbol "WILD" is rearranged in the symbol matrix element SM in which the frame 70*c* has been displayed. In this case, the symbols "Blank", "1Bar", "7", and "WILD" are rearranged, and the payout corresponding to a winning combination of the symbols "WILD" is determined (see FIG. 4A).

Figure 8A:
FIG. 8A is a view showing an exemplary image displayed during the free game in the slot machine shown in FIG. 2.
Figure 8B:
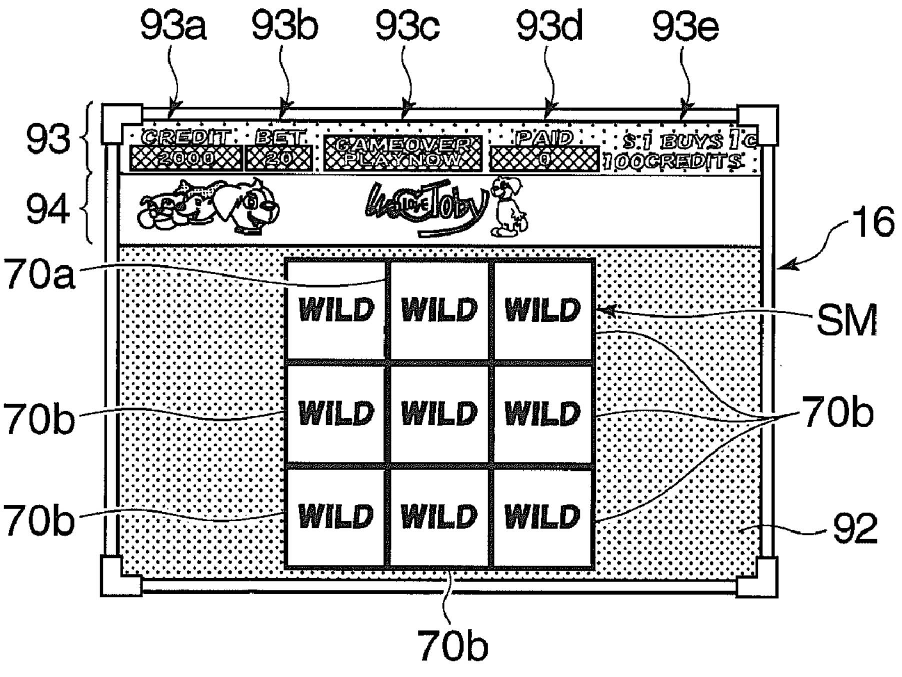
FIG. 8B is a view showing an exemplary image displayed during the free game in the slot machine shown in FIG. 2.

FIGS. 8A and 8B are views each showing an exemplary image displayed during the free game on the slot machine shown in FIG. 2. As shown in FIG. 8A, when the free games are executed more than once, the upper image display panel 33 displays the free-game-number display image 90*b* indicative of the remaining number of times in executing the free game. In this case, the free-game-number display image 90*b* of "3FREE GAME" is displayed indicating that three free games still remain.

As shown in FIG. 8B, the display region 92 displays the symbol matrix elements SM, in which the frame 70*a* is identifiably displayed where the symbol "WILD" is rearranged in any of the symbol matrix elements during the free game. Where the symbol "WILD" has been rearranged during the past free games, the frame 70*b* is displayed so as to make identifiable the rearrangement of the symbol "WILD" in the past free games. In this case, because the symbols "WILD" are rearranged in all of the symbol matrix elements SM, the free game is terminated, and then, the payout corresponding to the winning combination of the symbols "WILD" is determined (see FIG. 4A).

Next, a process executed in the slot machine 10 according to the first embodiment, will be described in detail with reference to the drawings. The main CPU 41 processes the game by reading out the game program.

Figure 9:
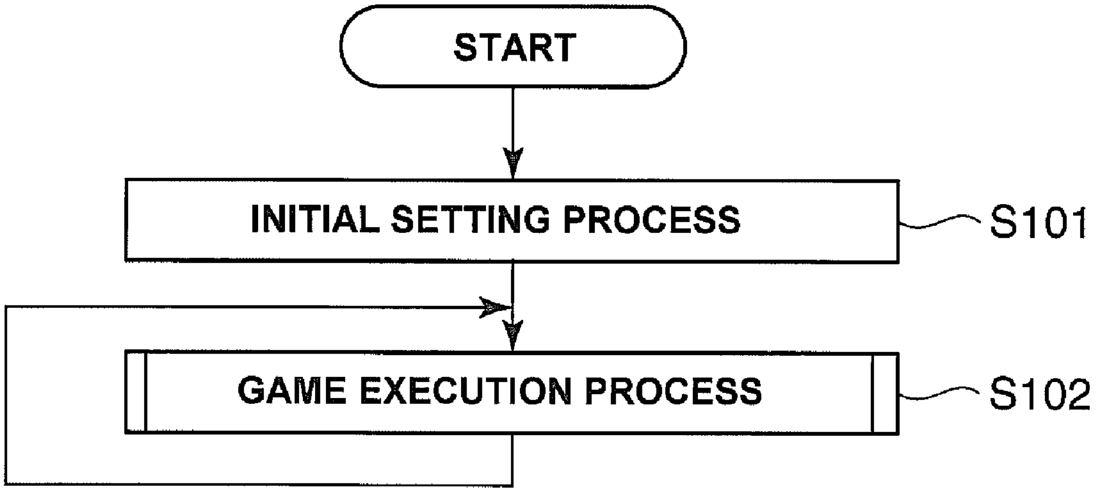
FIG. 9 is a flowchart showing a subroutine of a main process.

FIG. 9 is a flowchart showing a subroutine of a main process. In the main process, first, when a power switch is turned on (that is, when power is supplied), a mother board 40 and a gaming board 50 are activated respectively, so that the CPU 51 executes an initial setting process (step S101). In this initial setting process, the main CPU 41 executes the BIOS stored in the ROM 42, decompresses, in the RAM 43, compressed data included in the BIOS, executes the BIOS decompressed in the RAM 43, and performs diagnosis and initialization of each of the peripheral devices. The main CPU 41 writes game programs or the like from the ROM 42 into the RAM 43, and retrieves data for setting a payout ratio and country-identification information. The main CPU 41 also performs an authentication process for each program during execution of the initial setting process.

Next, the main CPU 41 performs a game execution process described later with reference to FIG. 10 (step S102). In this game execution process, the main CPU 41 sequentially reads and executes the game programs or the like from the ROM 42. By performing this game execution process, the slot machine 10 executes the game according to the first embodiment. The game execution process is repeatedly performed while power is supplied to the slot machine 10.

Figure 10:
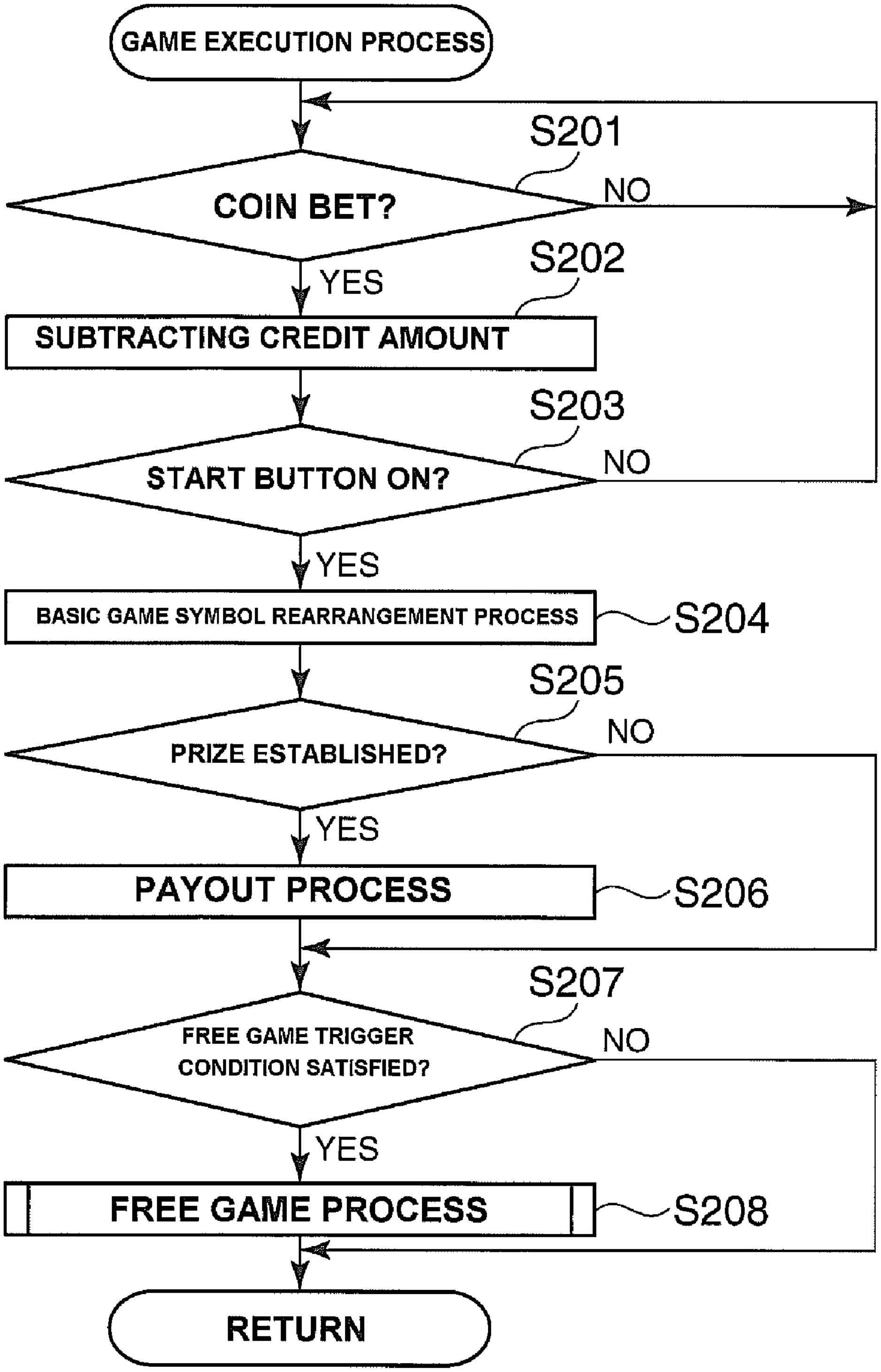
FIG. 10 is a flowchart showing a subroutine of a game execution process according to the first embodiment.

FIG. 10 is a flowchart showing a subroutine of the game execution process invoked and performed at step S102 of the subroutine shown in FIG. 9. First, the main CPU 41 judges whether or not a coin has been bet (step S201). Specifically, the main CPU 41 judges whether an input signal output from the 1-BET switch 26S at the time of operation of the 1-BET button 26 has been received or whether an input signal output from the max-BET switch 27S at the time of operation of the max-BET switch 27 has been received. The main CPU 41 controls the current step to return to the process at the step S201 upon judging that no coin has been bet (step S201: NO).

On the other hand, the main CPU 41 subtracts the number of bet coins from the credit amount stored in the RAM 43 (step S202) upon judging that a coin has been bet (step S201: YES). Where the number of bet coins is larger than the credit amount stored in the RAM 43, the main CPU 41 controls the current step to return to step S101 without performing the process for subtracting the number of bet coins from the credit number stored in the RAM 43. Where the number of bet coins exceeds the upper limit (50 coins in this embodiment) of coins that can be bet in one game, the main CPU 41 controls the step to return to step 203 without performing the process for subtracting the number of bet coins from the credit number stored in the RAM 43.

At step S203, the main CPU 41 judges whether or not the start button 23 has been set to ON (step S203). Specifically, the main CPU 41 judges whether or not an input signal output from the start switch 23S at the time of pushing of the start button 23 has been received. The main CPU 41 controls the step to return to step 201 upon judging that the start button 23 has not been set to ON (step S203: NO). Where the start button 23 has not been set to ON (for example, where an instruction has been input to terminate the game without setting the start button 23 to ON), the main CPU 41 cancels acceptance of a subtraction result at step S202.

On the other hand, the main CPU 41 performs a symbol rearrangement process of the basic game (step S204) upon judging that the start button 23 has been set to ON (step S203: YES). Specifically, the CPU 41 executes a program stored in the RAM 43 and determines the symbols to be rearranged in symbol matrix elements SM, from among the symbols "Blank", "1Bar", "2Bar", "3Bar", "7", and "WILD". This determination is based on the symbol weighting data and random numeric values sampled by sampling the random numeric values in a numerical range which comes under a predetermined range of random numeric values. The CPU 41 then rearranges the symbols in symbol matrix elements SM.

Next, the main CPU 41 judges whether a prize has been established or not (step S205). Specifically, the main CPU 41 judges whether a combination of symbols having been rearranged in the symbol matrix elements SM is a winning combination allowed to award any of payouts. Herein, the prize is established on condition that a winning combination is realized in which a predetermined number of identical symbols are rearranged in the symbol matrix elements SM where predetermined symbols are rearranged (see, FIG. 4).

Upon judging that the prize is established (step S205: YES), the main CPU 41 then performs a coin-payout process in accordance with the bet amount and the number of coins set for the winning combination (step S206). Where the coins are deposited, the main CPU 41 performs a process for adding the number of paid-out coins to the credit amount stored in the RAM 43. On the other hand, upon execution of the coin-payout process, the main CPU 41 pays out the predetermined number of coins by transmitting a control signal to the hopper 66.

Meanwhile, the main CPU 41 judges whether a free game trigger condition has been satisfied or not (step S207) when judging that the prize is not established (step S205: NO) or executing the process at step S206. Specifically, the main CPU 41 executes the program stored in the RAM 43 to sample the random numeric values in a numerical range which comes under a predetermined range of random numeric values, thereby judging whether or not the free game trigger condition has been satisfied based on the sampled random numeric values. Upon judging that the free game trigger condition is satisfied (step S207: YES), the main CPU 41 performs a free-game execution process described later with reference to FIG. 11 (step S208). In this free-game execution process, the main CPU 41 sequentially reads and executes the game programs or the like from the ROM 42 and performs the free-game execution process.

The CPU 41 terminates the game execution process when judging that the free game trigger condition is not satisfied (step S207: NO) or when executing the process at step S208.

Figure 11:
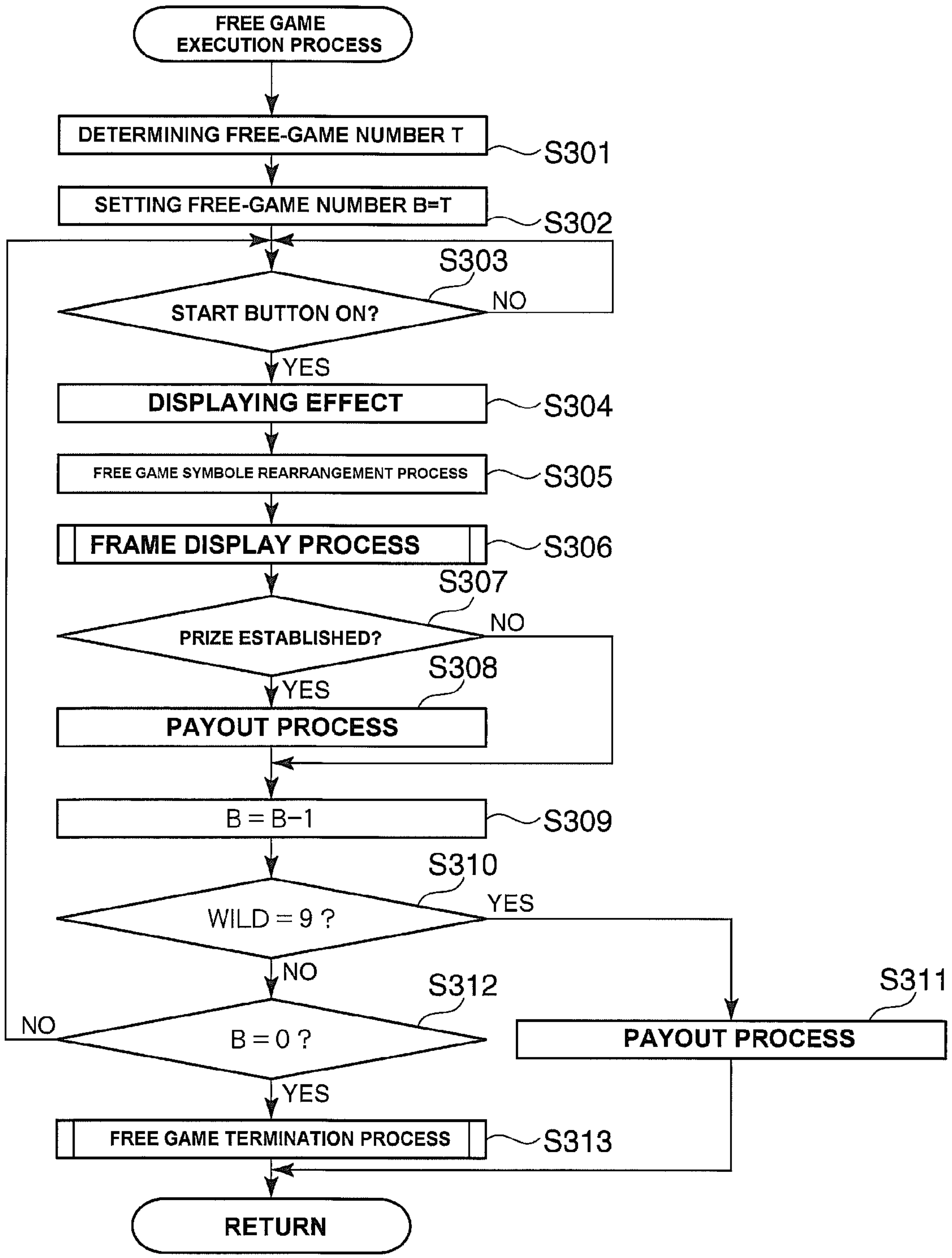
FIG. 11 is a flowchart showing a subroutine of a free game execution process according to the first embodiment.

FIG. 11 is a flowchart showing a subroutine of a free-game execution process that is invoked and executed at step S208 of the subroutine shown in FIG. 10. First, the main CPU 41 determines a free-game number T as a number of times of the free game (step S301). Specifically, the main CPU 41 executes the program stored in the RAM 43, thereby reading the number of times in executing the free game that is set in association with a random number using a random numeric value sampled in a numerical range which comes under a predetermined range of random numeric values 1 to 256. After that, the main CPU 41 determines the free-game number T.

Next, the main CPU 41 sets a free-game number B=T. Specifically, the main CPU 41 sets a remaining free-game number B=T in a storage area of the data indicative of the remaining free-game number B as the remaining number of times in executing the free game, provided in the RAM 43. T is the free-game number determined at step S301.

The main CPU 41 then judges whether the start button 23 has been set to ON or not (step S303). Specifically, the main CPU 41 judges whether or not an input signal has been received, the signal being output from the start switch 23S at the time of pushing of the start button 23. The main CPU 41 controls the step to return to step 303 upon judging that the start button 23 has not been set to ON (step S303: NO).

Upon judging that the start button 23 has been set to ON (step S303: YES), the main CPU 41 performs a process for displaying effect images (step S304). Specifically, the main CPU 41 displays the free-game-number display images 90*a* to 90*c* (see, FIGS. 5A to 8B) corresponding to the number of times in executing the free game on the upper image display panel 33.

Next, the main CPU 41 performs a process for rearranging symbols in the free game (step S305). Specifically, the CPU 41 executes the program stored in the RAM 43 and determines the symbols to be rearranged in symbol matrix elements SM displayed in the lower image display panel, from among the symbols "Blank", "1Bar", "2Bar", "3Bar", "7", and "WILD". This determination is based on the symbol weighting data and random numeric values sampled by sampling the random numeric values in a numerical range which comes under a predetermined range of random numeric values. The CPU 41 then rearranges the symbols to be arranged in symbol matrix elements SM.

The main CPU 41 then performs a frame display process described later with reference to FIG. 12 (S306). In this frame display process, the main CPU 41 performs a process for identifiably displaying a frame upon rearrangement of the symbol "WILD".

Next, the main CPU 41 judges whether or not a prize has been established (step S307). Specifically, the main CPU 41 judges whether a combination of symbols having been rearranged in the symbol matrix elements SM is a winning combination that awards any of payouts. The prize is established on condition that a winning combination is realized in which a predetermined number of identical symbols are rearranged in the symbol matrix elements SM where predetermined symbols are rearranged (see, FIG. 4).

Thereafter, upon judging that the prize has not been established (step S307: YES), the main CPU 41 performs a coin-payout process in accordance with the bet amount and the number of coins set for the winning combination (step S307: YES). In the case where the coins are deposited, the main CPU 41 performs a process for adding the number of paid-out coins to the credit amount stored in the RAM 43. On the other hand, where the coins are paid out, the main CPU 41 pays out the predetermined number of coins by transmitting the control signal to the hopper 66.

On the other hand, upon judging that the prize has not been established (step S307: NO), or executing the process at step S308, the main CPU 41 sets the remaining free-game number B=B−1 (step S309). Specifically, the main CPU 41 sets B=B−1 at a value of the free-game number B stored in the RAM 43.

The main CPU 41 then judges whether the number of symbols "WILD" is equal to nine or not (step S310). Specifically, the main CPU 41 judges whether or not the symbols "WILD" have been rearranged in all of the symbol matrix elements SM (see, FIG. 8). Upon judging that the symbols "WILD" have been rearranged in all of the symbol matrix elements SM (step S310: YES), the main CPU 41 performs the coin-payout process in accordance with the bet amount and the number of coins set for the winning combination (step S311). In the case where the coins are deposited, the main CPU 41 performs a process for adding the number of paid-out coin to the credit amount stored in the RAM 43. On the other hand, where the coins are paid out, the main CPU 41 pays out the predetermined number of coins by transmitting the control signal to the hopper 66.

Upon judging that the number of symbols "WILD" is not equal to nine (step S310: NO), the main CPU 41 judges whether or not a value of the remaining free-game number B is equal to zero (step S311). Upon judging that the value of the remaining free-game number B is not zero (step S312: NO), the main CPU 41 controls the step to return to step S303.

On the other hand, upon judging that the value of B is equal to zero (step S312: YES), the main CPU 41 performs a free-game termination process described later with reference to FIG. 13 (step S313). In this free-game termination process, the main CPU 41 performs a process for rearranging the symbols "WILD" in the frames 70*a* to 70*c* displayed in the symbol matrix elements SM. The main CPU 41 terminates the free-game execution process when executing the process at step S311.

Figure 12:
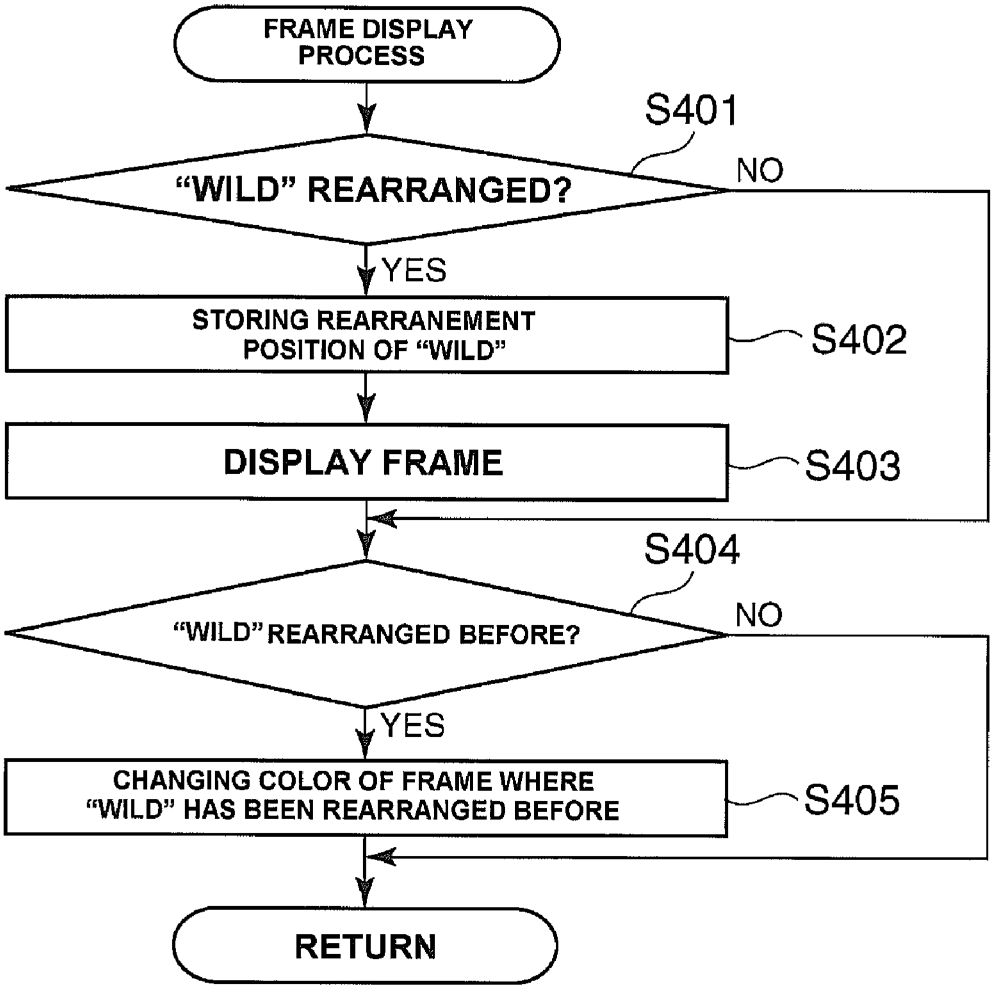
FIG. 12 is a flowchart showing a subroutine of a frame display execution process according to the first embodiment.

FIG. 12 is a flowchart showing a subroutine of a frame display execution process invoked and executed at step S306 of the subroutine shown in FIG. 11. First, the main CPU 41 judges whether or not the symbol "WILD" has been rearranged in the free game (step S401). Specifically, the main CPU 41 judges whether or not the symbol "WILD" has been rearranged in any of the symbol matrix elements SM during the free game. Upon judging that the symbol "WILD" has not been rearranged during the free game (step S401: NO), the main CPU 41 controls the step to move to step S404.

On the other hand, upon judging that the symbol "WILD" has been rearranged during the free game (step S401: YES), the main CPU 41 stores the information regarding the rearrangement of the symbol "WILD" (step S402). Specifically, the main CPU 41 stores positional information of the symbol "WILD" rearranged in the symbol matrix element SM.

Next, the main CPU 41 displays a frame (stem S403). Specifically, the main CPU 41 displays the frame 70*a* (see, FIG. 5) in order to identifiably display the symbol "WILD" rearranged during the free game. The main CPU 41 then judges whether or not the symbol "WILD" has been rearranged during the past free games (step S404). Specifically, the main CPU 41 judges whether or not the RAM 43 stores the positional information of the symbol "WILD", regarding the position at which the symbol "WILD" has been rearranged in the symbol matrix element SM during the past games. In the case of judgment that no symbol "WILD" has been rearranged during the past free games (step S404: NO), the main CPU 41 terminates the frame display process.

On the other hand, upon judging that the symbol "WILD" has been rearranged during the past free games (step S404: YES), the main CPU 41 changes a color of a frame in which the symbol "WILD" has been rearranged during the past free games. Specifically, the main CPU 41 determines a color of the frame based on the positional information of the symbol "WILD" stored in the RAM 43, thereby displaying the frame 70*b* (see, FIG. 6). The main CPU 41 terminates the frame display process when executing the process at step S405.

Figure 13:
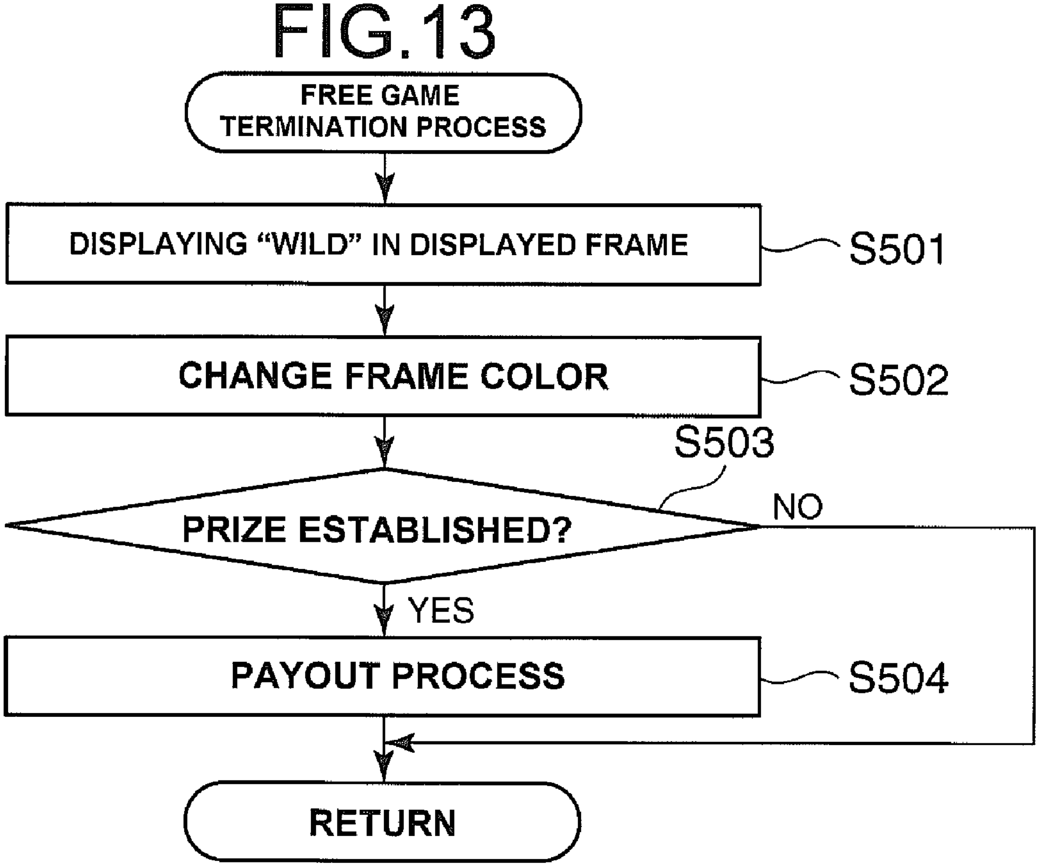
FIG. 13 is a flowchart showing a subroutine of a free game termination process according to the first embodiment.

FIG. 13 is a flowchart showing a subroutine of a free-game termination process that is executed by being invoked at step S313 of the subroutine shown in FIG. 11. First, the main CPU 41 displays the symbol "WILD" in the displayed frame (step S501). Specifically, the CPU 41 controls the symbol "WILD" to be rearranged in the frame 70*a* that is displayed at step S403 and controls the symbol to be rearranged in the frame 70*b* that is displayed at step S404, the symbol "WILD" having been rearranged during the past free games.

Next, the main CPU 41 changes a color of the frame (step S502). Specifically, the main CPU 41 changes the respective colors of the frame 70*a*, that is displayed at step S403 where the symbol "WILD" is rearranged, and the frame 7*b*, that is displayed at step S404 where the symbol "WILD" has been rearranged during the past free games. The main CPU 41 then displays the frame 70*c*.

Thereafter, the main CPU 41 judges whether the prize has been established or not (step S503). Specifically, the main CPU 41 judges whether or not a combination of symbols having been rearranged in the symbol matrix elements SM is a winning combination that awards any of payouts. Upon judging that the prize has not been established (step S503: NO), the main CPU 41 terminates the free-game termination process.

Upon judging that the prize has been established (step S503: YES), on the other hand, the main CPU 41 performs the coin-payout process in accordance with the bet amount and the number of coins set for the winning combination (step S504). Where the coins are deposited, the main CPU 41 performs the process for adding the number of paid-out coin to the credit amount stored in the RAM 43. On the other hand, where the coins are paid out, the main CPU 41 pays out a predetermined number of coins by transmitting the control signal to the hopper 66. The main CPU 41 terminates the free-game termination process when executing the process at step S504.

Next, a slot machine 100 according to a second embodiment will be described with reference to the drawings. The slot machine according to the second embodiment below is a so-called hybrid slot machine in which a plurality of rotatably-supported mechanical reels have a transparent liquid crystal panel on front surfaces to display images of various symbols drawn on peripheral surfaces of the mechanism reels through the transparent liquid crystal panel through which the pictures are allowed to pass. The slot machine according to the second embodiment has an appearance, circuitry, and the like that are substantially the same as those of the slot machine 10 according to the first embodiment. Thus, a duplicated explanation is omitted here. Constituent elements corresponding to those of the slot machine 10 are designated by the same reference numerals and are explained.

Figure 14:
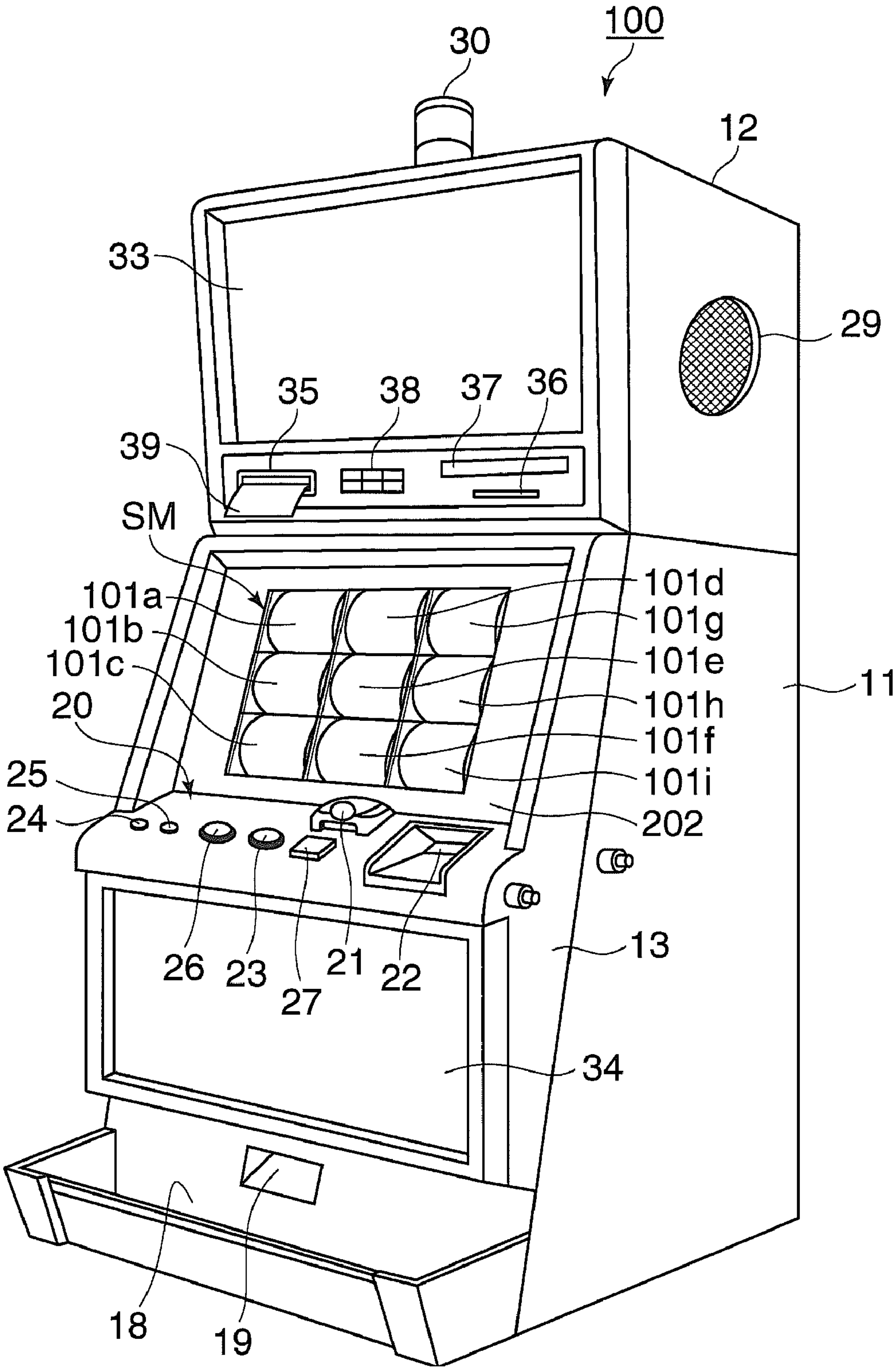
FIG. 14 is a view showing a frame format of an appearance of a slot machine according to a second embodiment.

FIG. 14 is a view for schematically showing the appearance of the slot machine according to the second embodiment of the present invention. As shown in FIG. 14, the slot machine 100 is rotatably provided with nine reels 101*a* to 101*i*. On the respective one of the outer circumferential surfaces of the reels 101*a* to 101*i*, a symbol column made up of the symbols "Blank", "1Bar", "2Bar", "3Bar", "7", and "WILD" is drawn.

A main liquid crystal 202 formed of a transparent liquid crystal panel, which is disposed at the main door, is provided in front of the respective reels 101*a* to 101*i*. The main liquid crystal panel 202 displays symbol matrix elements SM with visually recognizable rear surfaces so as to surround symbols displayed in the reels 101*a* to 101*i* in a stopped state, respectively. The symbols drawn on the reels 101*a* to 101*i* are visualized by rendering the symbol matrix elements SM transparent.

Figure 15C:
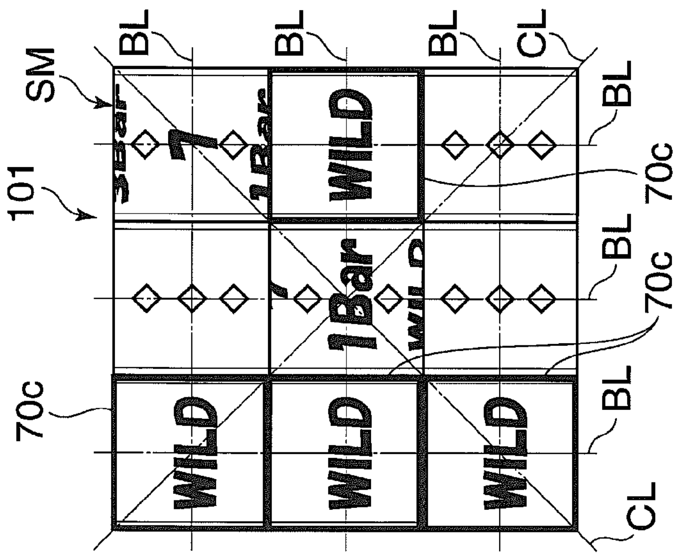
FIG. 15C is a view showing an exemplary symbol matrix during the free game according to the second embodiment.
Figure 15B:
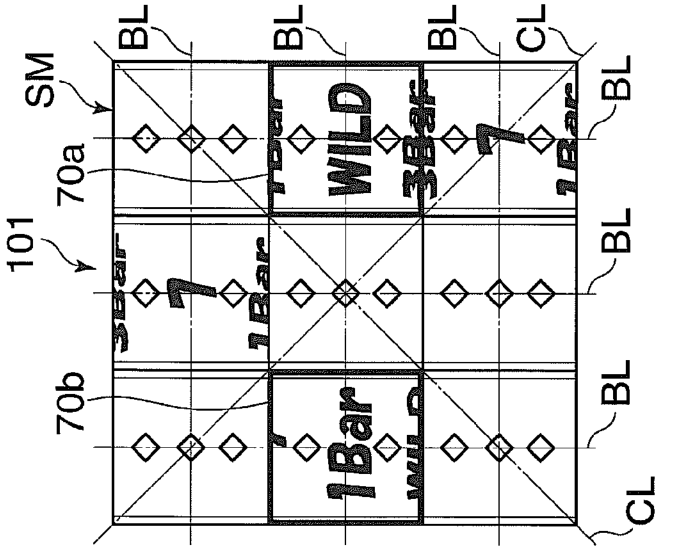
FIG. 15B is a view showing an exemplary symbol matrix during the free game according to the second embodiment.
Figure 15A:
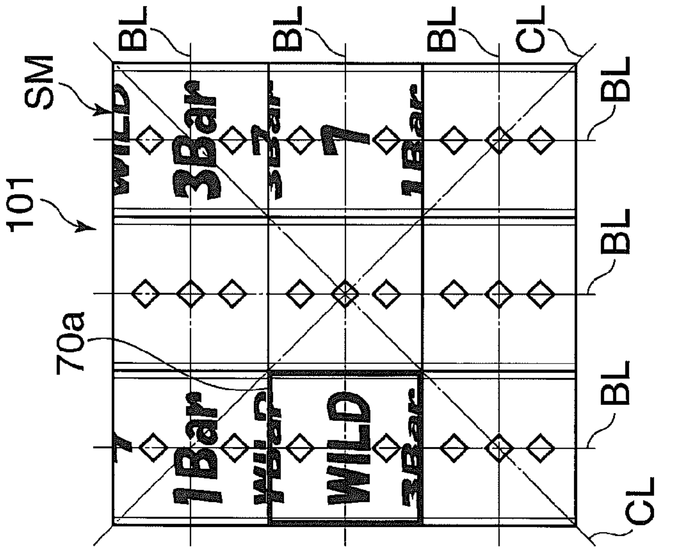
FIG. 15A is a view showing an exemplary symbol matrix during a free game according to the second embodiment.

FIGS. 15A and 15B are views each showing exemplary symbol matrix elements during the free game. FIG. 15C is a view showing exemplary symbol matrix elements at the time of termination of the free game. As shown in FIGS. 1A to 1C, the symbol matrix SM is displayed on the liquid crystal panel 202 provided at the slot machine 100 according to the present invention. A back side of the liquid crystal panel 202 is provided with a total of nine reels 101*a* to 101*i* in three columns and three rows in a rotatable manner.

As shown in FIG. 15A, where any of the nine reels 101 is displayed in a stopped state with the symbol "WILD" thereon during the free game, the frame 70*a* is identifiably displayed in the symbol matrix element SM displaying the symbol "WILD" in a stopped state. The symbols "Blank", "1Bar", "2Bar", "3Bar", "7", and "WILD" are displayed in a stopped state, and the symbol matrix element SM, in which the symbol "WILD" is displayed in a stopped state, displays the frame 70*a* to identify that the symbol "WILD" is displayed in a stopped state.

As shown in FIG. 15B, where any of the nine reels 101 is displayed in a stopped state with the symbol "WILD" thereon during the free game, the frame 70*a* is identifiably displayed in the symbol matrix element SM displaying the symbol "WILD" in a stopped state. Furthermore, where the symbol "WILD" has been displayed in a stopped state during the past games, the frame 70*b* is identifiably displayed in the symbol matrix element SM displaying the symbol "WILD" in a stopped state. Herein, the symbols "Blank", "1Bar", "2Bar", "3Bar", "7", and "WILD" are displayed in a stopped state. The symbol matrix element SM, in which the symbol "WILD" is displayed in a stopped state, displays the frame 70*a* to identify that the symbol "WILD" is displayed in a stopped state. The symbol matrix element SM, in which the symbol "WILD" has been displayed in a stopped state, displays the frame 70*b* to identify that the symbol "WILD" has been displayed during the past free games.

As shown in FIG. 15C, where the symbol "WILD" is displayed in any of the symbol matrix elements in a stopped state at the time of termination of the last free game on condition that the symbol "WILD" has been displayed in a stopped state during the past free games, the frame 70*c* is identifiably displayed and the symbol "WILD" is displayed so as to cover the reel 101, in the symbol matrix element displaying the frame 70*c*. The symbols "Blank", "1Bar", and "7" are displayed in a stopped state in the reel 101. The lower image display panel 16 displays the symbol "WILD" in the symbol matrix element displaying the frame 70*c*, so as to cover the reel 101. The payout is then determined based on the winning combination of the symbols "WILD".

Figure 16:
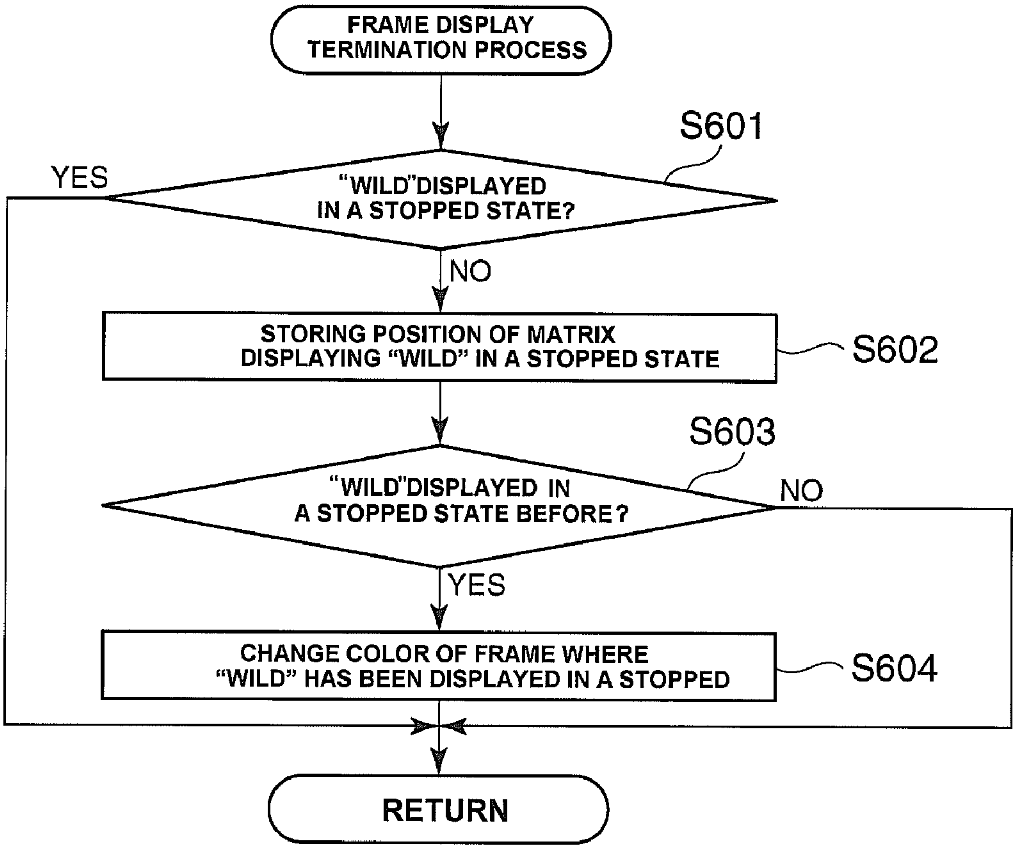
FIG. 16 is a flowchart showing a subroutine of a frame display execution process according to the first embodiment.

FIG. 16 is a flowchart showing a subroutine of a frame display execution process invoked and executed at step S306 of the subroutine in FIG. 11. First, the main CPU 41 judges whether or not the symbol "WILD" has been displayed in a stopped state during the free game (step S601). Specifically, the main CPU 41 judges whether or not the symbol "WILD" has been displayed in a stopped state in any of the reels 101*a* to 101*i* during the free game. The main CPU 41 controls the step to move to step S604 upon judging that none of the symbols "WILD" has been displayed in a stopped state during the free game (step S401: NO).

On the other hand, upon judging that the symbol "WILD" has been displayed in a stopped state during the free game (step S601: YES), the main CPU 41 stores a position of the symbol matrix element SM in which the symbol "WILD" is displayed (step S602). Specifically, the main CPU 41 stores in the RAM 43 the positional information of the symbol matrix SM in which the symbol "WILD" has been displayed in a stopped state.

Next, the main CPU 41 displays the frame (step S603). Specifically, the main CPU 41 displays the frame 70*a* (see, FIG. 15) on the liquid crystal panel 202 to identifiably display the symbol "WILD" in a stopped state during the free game. The main CPU 41 then judges whether or not the symbol "WILD" has been displayed in a stopped state during the past free games (step S604). Specifically, the main CPU 41 judges whether or not the RAM 43 stores the positional information of the symbol matrix element SM in which the symbol "WILD" has been displayed in a stopped state during the past free games. Upon judging that the symbol "WILD" has not been displayed during the past free games (step S604: NO), the main CPU 41 terminates the frame display process.

On the other hand, upon judging that the symbol "WILD" has been displayed in a stopped state during the past free games (step S604: YES), the main CPU 41 changes a color of the frame in which the symbol "WILD" has been displayed in a stopped state during the past games (step S405). Specifically, the main CPU 41 displays the frame 70*b* on the liquid crystal panel 202 by determining a color of the frame. This determination is based on the positional information of the symbol matrix element SM stored in the RAM 43, in which the symbol "WILD" has been displayed in a stopped state (see, FIG. 6). The main CPU 41 terminates the frame display process when executing the process at step S405.

The slot machine according to embodiments of the present invention is constituted to store the positional information of the symbol matrix SM as a symbol display region in which the symbol "WILD" is rearranged during the free game. This slot machine is also constituted to display the frames 70*a* to 70*c* so as to identify that the symbol "WILD" is rearranged again during the last free game, in the symbol matrix element SM in which the symbol "WILD" has been rearranged. It is further constituted to rearrange again the symbol "WILD" in the symbol matrix element SM in which the symbol "WILD" has been rearranged during the past free games.

The slot machine according to embodiments of the present invention determines the number of times of the free game, and completes the free game in a case where the symbols "WILD" are rearranged in all of the symbol matrix elements SM the predetermined number of times prior to the free games.

In the foregoing, while the embodiments of the present invention have been described, these embodiments merely present specific examples. An appropriate design change can be made for the specific configuration of each means or the like. Also, the effects described in the embodiments of the present invention are only listing the most preferable effects arising from the present invention, and the effects of the present invention are not limited to those described in the embodiments of the present invention.

What is claimed is:

1. A slot machine, comprising:

a display device having a plurality of symbol display regions in which plural types of symbols are displayed;

a memory for storing positional information of the symbol display regions in which predetermined symbols are arranged; and a processor for controlling the display device and the memory, the processor being programmed to:

(a) execute a basic game;

(b) execute a free game in a case where a predetermined condition is satisfied during the basic game;

(c) rearrange the plural types of symbols during the free game;

(d) store in the memory the positional information of the symbol display regions in which the predetermined symbols are arranged during the free game; and (e) rearrange the plural types of symbols during a last free game based on the stored positional information of the symbol display regions so that the predetermined symbols are arranged again in the symbol display regions in which the predetermined symbols have been arranged during past free games.

2. The slot machine according to claim 1, wherein:

the processor is further programmed to:

(f) display the predetermined symbols in a manner to make identifiable rearrangement of the predetermined symbols during the last free game in the symbol display regions in which the predetermined symbols have been arranged during free games from a free game subsequent to a first free game to the last free game.

3. The slot machine according to claim 2, wherein:

the processor further programmed to:

(g) determine a number of times in executing the free game; and (h) terminate the free game before executing the free game the determined number of times in a case where the predetermined symbols are arranged in all positions of the symbol display regions.

4. A slot machine, comprising:

a display device having a plurality of symbol display regions in which plural types of symbols are displayed;

a memory for storing positional information of the symbol display regions in which a predetermined symbols are arranged; and a processor for controlling the display device and the memory, the processor being programmed to:

(a) execute a basic game;

(b) execute a free game in a case where a predetermined condition is satisfied during the basic game;

(c) rearrange the plural types of symbols during the free game;

(d) store in the memory the positional information of the symbol display regions in which the predetermined symbols are arranged during the free game;

(e) display the predetermined symbols so as to make identifiable rearrangement of the predetermined symbols during a last free game in the symbol display regions in which the predetermined symbols have been arranged during free games from a free game subsequent to a first free game to the last free game; and (f) rearrange the plural types of symbols during the last free game based on the stored positional information of the symbol display regions so that the predetermined symbols are arranged again in the symbol display regions in which the predetermined symbols have been arranged during past free games.

5. The slot machine according to claim 4, wherein:

the processor is further programmed to:

(g) determine a number of times of the free game; and (h) terminate the free game before executing the free game the determined number of times in a case where the predetermined symbols are arranged in all positions of the symbol display regions.

6. A slot machine, comprising:

a display device having a plurality of symbol display regions in which plural types of symbols are displayed;

a memory for storing positional information of the symbol display regions in which predetermined symbols are arranged; and a processor for controlling the display device and the memory, the processor being programmed to:

(a) execute a basic game;

(b) execute a free game in a case where a predetermined condition is satisfied during the basic game;

(c) determine a number of times in executing the free game;

(d) rearrange the plural types of symbols during the free game;

(e) store in the memory the positional information of the symbol display regions in which the predetermined symbols are arranged during the free game;

(f) display the predetermined symbols so as to make identifiable rearrangement of the predetermined symbols during a last free game in the symbol display regions in which the predetermined symbols have been arranged during free games from a free game subsequent to a first free game to the last free game;

(g) rearrange the plural types of symbols during the last free game based on the stored positional information of the symbol display regions so that the predetermined symbols are arranged again in the symbol display regions in which the predetermined symbols have been arranged during past free games; and (h) terminate the free game before executing the free game the determined number of times in a case where the predetermined symbols are arranged at all positions of the symbol display regions.

* * * * *